United States Patent [19]

Minuado

[11] Patent Number: 5,259,746
[45] Date of Patent: Nov. 9, 1993

[54] EXTRUSION HEAD

[75] Inventor: Diego Minuado, Rome, Italy

[73] Assignee: Bridgestone/Firestone, Inc., Akron, Ohio

[21] Appl. No.: 832,134

[22] Filed: Feb. 6, 1992

[30] Foreign Application Priority Data

Mar. 15, 1991 [IT] Italy .................. TO91A 000193

[51] Int. Cl.⁵ ............................................. B29C 47/02
[52] U.S. Cl. .................................... 425/14; 425/190; 425/376.1; 425/461
[58] Field of Search .................. 264/176.1, 174; 425/113, 114, 188, 190, 192 R, 376.1, 461, 462

[56] References Cited

U.S. PATENT DOCUMENTS

| | | | |
|---|---|---|---|
| 3,737,262 | 6/1983 | Klein | 425/113 |
| 4,150,929 | 4/1979 | Brandt | 425/114 |
| 4,274,821 | 6/1981 | Kiemer | 425/114 |
| 4,295,812 | 10/1981 | Hoddinott | 425/114 |
| 4,300,878 | 11/1981 | Ible | 425/114 |
| 4,497,762 | 2/1985 | Meister | 425/114 |

FOREIGN PATENT DOCUMENTS

| | | |
|---|---|---|
| 0046688 | 3/1982 | European Pat. Off. . |
| 0339510 | 11/1989 | European Pat. Off. . |
| 1199488 | 8/1965 | Fed. Rep. of Germany . |
| 2513003 | 3/1983 | France . |

*Primary Examiner*—Scott Bushey
*Attorney, Agent, or Firm*—David A. Thomas

[57] ABSTRACT

An extrusion head (1) defined by a number of superimposed plates (7,8,9,10) and by a casing (55) housing the plates (7,8,9,10) and defining two shoulder surfaces (68,69) forming an angle and perpendicular to the plates (7,8,9,10); the plates (7,8,9,10), when packed together, defining an intermediate guide duct (35) for guiding reinforcing wires and two supply ducts (11,23) for supplying extruded elastomeric material located on opposite sides of the intermediate duct (35), and providing for locking together a wire guiding device (36) and a die (37) presenting respective flat shoulders (42,43;50,51) parallel to a first (68) of the shoulder surfaces (68,69) and pressed by the plates (7,8,9,10) into contact with one another and with the first shoulder surface (68), with the die (37) located between the first shoulder surface (68) and the wire guiding device (36).

6 Claims, 3 Drawing Sheets

EXTRUSION HEAD

TECHNICAL FIELD

The present invention relates to an extrusion head for producing tire tread plies.

BACKGROUND OF THE ART

In particular, the present invention relates to an extrusion head of the type comprising a number of shaped plates, a wire or ply reinforcement guiding device and a die. When packed together, said plates define an intermediate guide duct for reinforcing wires, and two supply ducts for extruded elastomeric material located on opposite sides of the guide duct, and provide for locking together the wire guiding device and the die.

Known extrusion heads of the aforementioned type normally comprise a pack of four plates, the middle two of which define the intermediate guide duct and two cavities respectively housing the wire guiding device and die, which are kept a given distance apart so as to define an upper and lower passage between the die inlet and the two ducts supplying the elastomeric material.

The major drawback of such an arrangement is that the wire guiding device and die, the mutual position of which determines the geometrical characteristics of the tread plies, present separate connecting points or shoulders and are not directly connected. Consequently, differing wear on the shoulders results in a corresponding variation in the mutual position of the wire guiding device and die and in the characteristics of the tread plies.

SUMMARY OF THE INVENTION

It is an object of the present invention to provide an extrusion head of the aforementioned type designed to overcome the aforementioned drawback.

According to the present invention, there is provided an extrusion head for producing tread plies for road vehicle tires, connectable to the outlet of an extruder and comprising a number of shaped plates, a wire guiding device and a die; said plates, when packed together, defining an intermediate guide duct for guiding reinforcing wires, and two supply ducts for supplying extruded elastomeric material located on opposite sides of said guide duct, and locking together said wire guiding device ad said die; characterized in that it also comprises locating wall means perpendicular to said plates; said die presenting a first and second opposite surface parallel to said locating wall means; said wire guiding device presenting a third surface parallel to said locating wall means; and pressure means being provided for acting on said plates in a first direction perpendicular to said locating wall means, so as to compress said die with said first surface contacting said locating wall means, and said wire guiding device with said third surface contacting said second surface.

BRIEF DESCRIPTION OF THE DRAWINGS

A non-limiting embodiment of the present invention Will be described by way of example with reference to the accompanying drawings, in which.

BEST MODE FOR CARRYING OUT THE INVENTION

Figure 1:
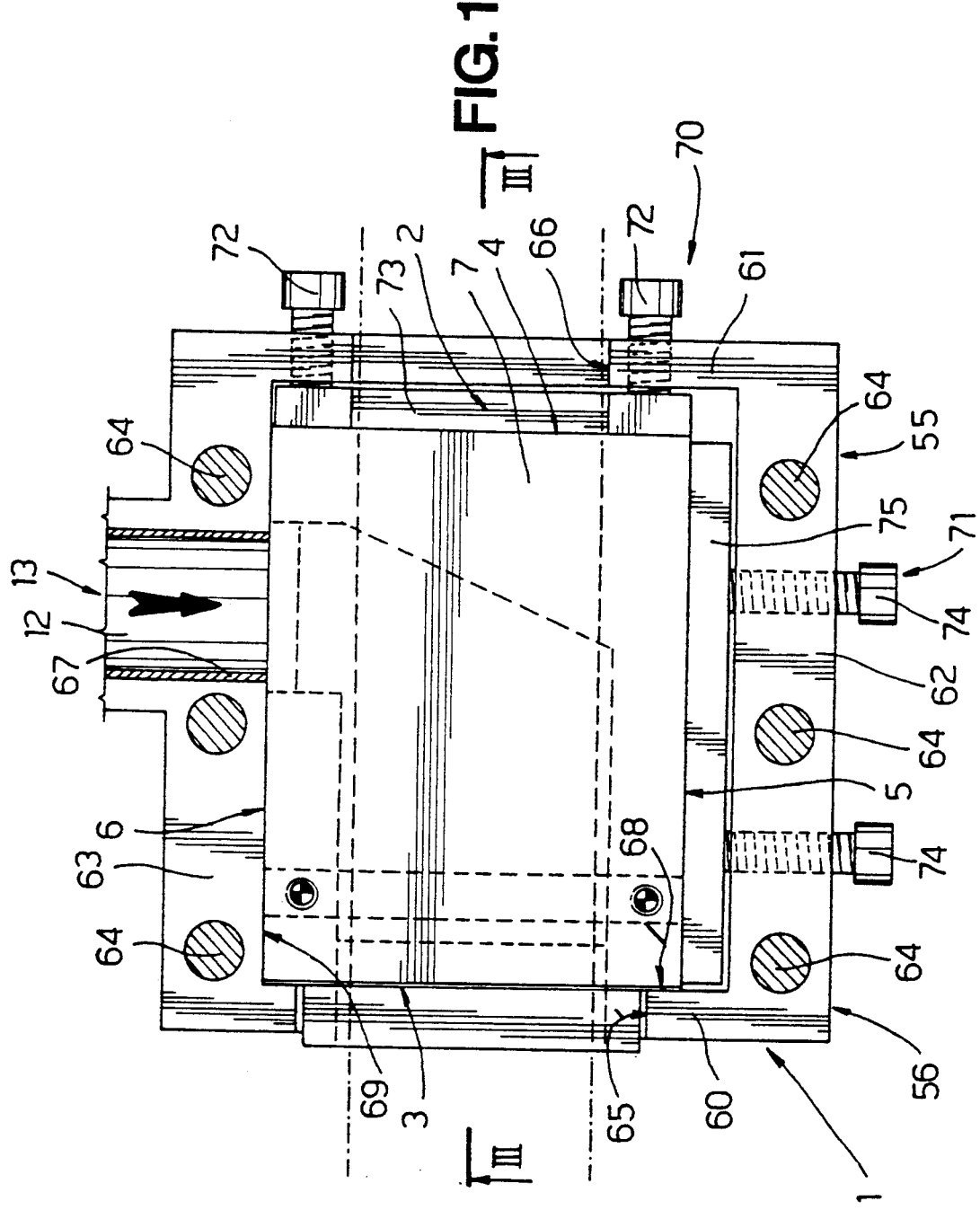
FIG. 1 shows a schematic plan view of a preferred embodiment of an extrusion head in accordance with the present invention.
Figure 2:
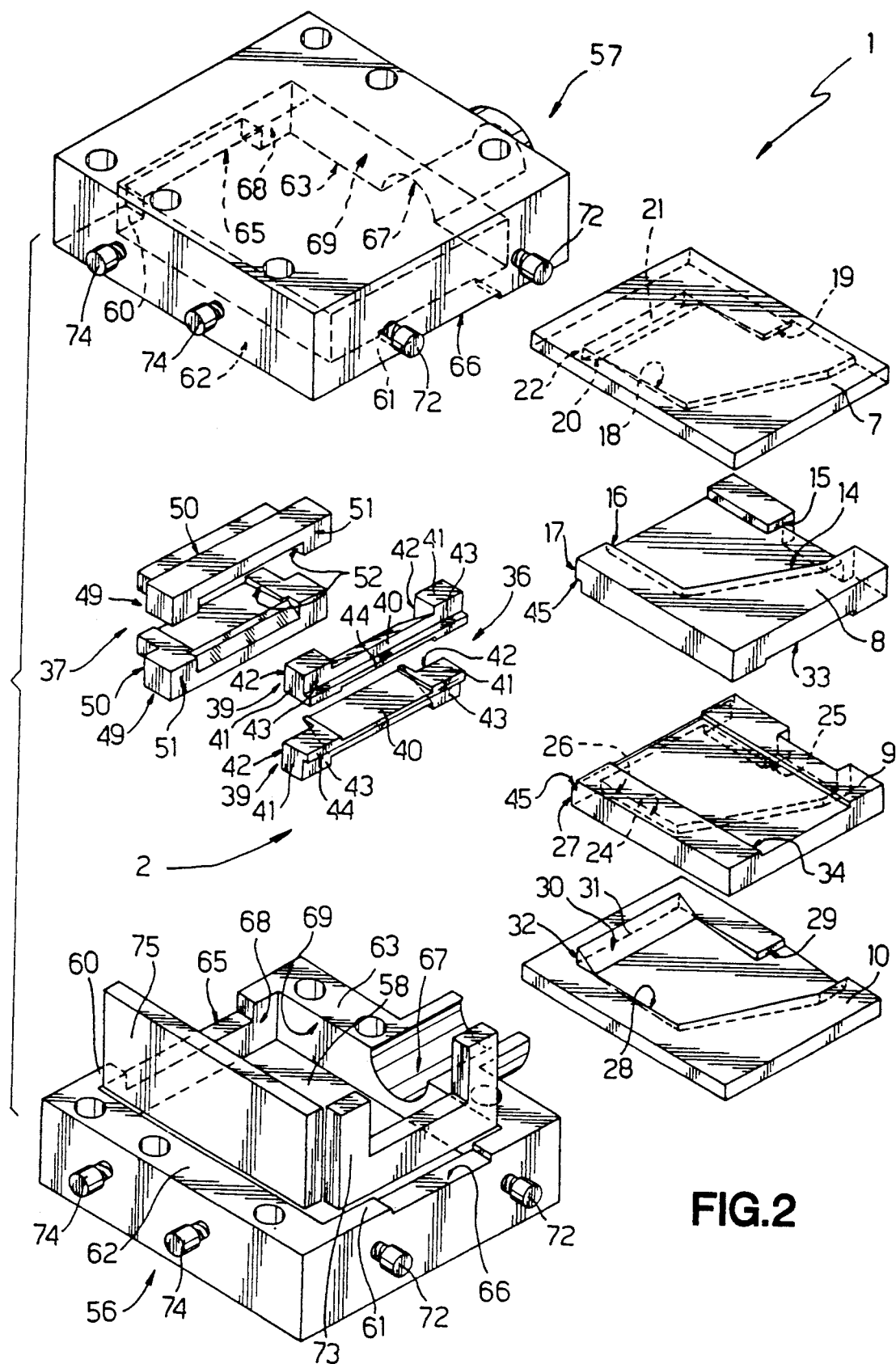
FIG. 2 shows a schematic exploded view of the FIG. 1 head with parts removed for simplicity.
Figure 3:
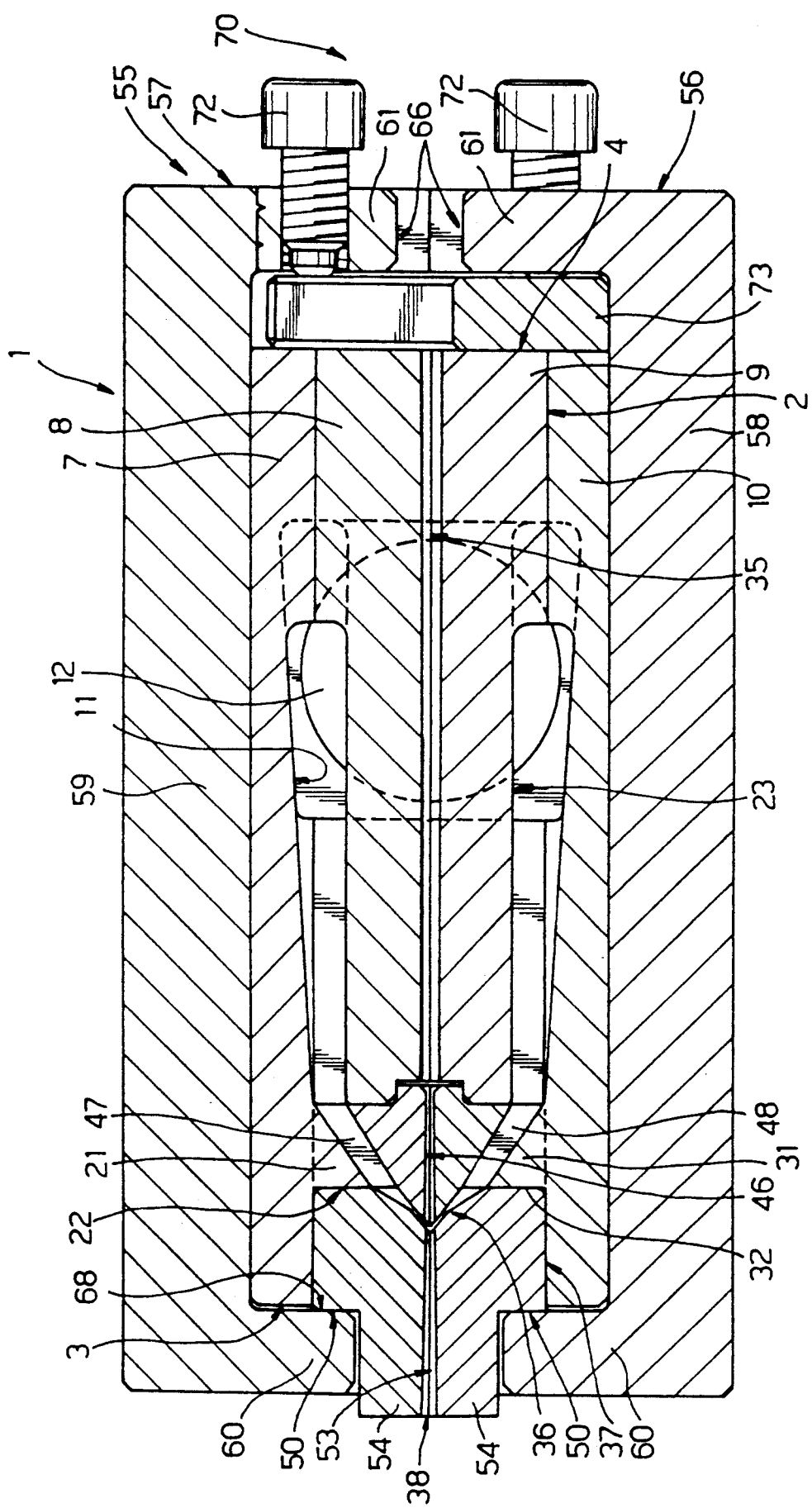
FIG. 3 shows a section along line III—III in FIG. 1.

Number 1 in FIGS. 1 to 3 indicates an extrusion head for producing tread plies (not shown) for road vehicle tires. Head 1 includes an intermediate body 2 substantially in the form of a rectangular parallelepipedon defined laterally by a front surface 3, rear surface 4 and two lateral surfaces 5 and 6.

Body 2 includes four superimposed plates 7, 8, 9 and 10, of which plates 8 and 9, arranged for contacting each other between plates 7 and 10, are of the same width as but shorter than plates 7 and 10, and are arranged with their rear end surfaces coplanar with the respective rear surfaces of plates 7 and 10 so as to define rear surface 4.

Top plate 7 and adjacent plate 8 are so shaped as to define a duct 11 having a substantially L-shaped horizontal section and an inlet at one end opening onto surface 6 and communicating with the outlet 12 of an extruder 13.

In particular, for defining duct 11, the top surface of plate 8 presents a substantially L-shaped groove 14 extending from an inlet 15 facing surface 6 to an outlet 16 at front surface 17 of plate 8 facing, parallel to and set back in relation to surface 3. Similarly, the bottom surface of plate 7 presents a groove 18 identical to groove 14 and extending from an inlet 19 facing inlet 15. As it nears the outlet end of duct 11, groove 18 gradually gets shallower until, at outlet 16, the bottom of groove 18 blends with an oblique lateral surface 20 of a plate 21 parallel to surface 3 and projecting downwardly from the bottom surface of plate 7. Plate 21 which is as long as the width of groove 18, is located centrally on plate 7, and, on the side facing surface 3, is defined by a surface 22 perpendicular to plate 7 and parallel to surface 3, a top portion of which is formed by the front lateral surface of plate 7.

Bottom plate 10 and adjacent plate 9 are so shaped as to define a duct 23 which, like duct 11, presents a substantially L-shaped horizontal section and an inlet at one end opening onto surface 6 and communicating with the outlet 12 of extruder 13.

In particular, for defining duct 23, the bottom surface of plate 9 presents a substantially L-shaped groove 24 extending from an inlet 25 facing surface 6 to an outlet 26 at front surface 27 of plate 9 facing, parallel to and set back in relation to surface 3. Similarly, the top surface of plate 10 presents a groove 28 identical to groove 24 and extending from an inlet 29 facing inlet 25. As it nears the outlet end of duct 23, groove 28 gradually gets shallower until, at outlet 26, the bottom of groove 28 blends with an oblique lateral surface 30 of a plate 31 parallel to surface 3 and projecting upwardly from the top surface of plate 10. Plate 31, which is as long as the width of groove 28, is located centrally on plate 10, and, on the side facing surface 3, is defined by a surface 3 perpendicular to plate 10, coplanar with surface 22 and parallel to surface 3, a bottom portion of which is formed by the front lateral surface of plate 10.

The contacting surfaces of adjacent plates 8 and 9 present respective straight grooves 33 and 34 defining a straight duct 35, the inlet of which opens onto rear surface 4, and the outlet of which opens onto the surface defined by coplanar surfaces 17 and 27 for enabling the passage of a number of reinforcing cords (not shown) for a known tread ply (not shown) in which said cords are enclosed between two layers of elastomeric material (not shown).

As shown more clearly in FIGS. 2 and 3, body 2 also comprises a wire guiding device 36 in front of the outlet of duct 35 and gripped between plates 7 and 10 for guiding said cords to the inlet of a die 37. Die 37 forms part of body 2, and is located between plates 7 and 10, in front of wire guiding device 36, for receiving said cords and two layers of elastomeric material from ducts 11 and 23, and feeding them together to a mouth or die outlet 38 ahead of front surface 3 of body 2.

As shown particularly in FIG. 2, wire guiding device 36 comprises two secularly identical blocks 39 arranged facing and one on top of the other, and each parallel to surface 3 and equal in length to the distance between surfaces 5 and 6. Each block 39 is the same thickness as each of plates 8 and 9, and comprises a wedge-shaped intermediate portion 40 and two end portions 41, each in the form of a rectangular parallelepipedon having a front surface 42 and rear surface 43 parallel to surfaces 3, 17 and 27. Each block 39 also presents a rear longitudinal rib 44 with which corresponds a groove 45 on facing surface 17, 27. The facing surfaces of said two intermediate portions 40 define a wire guiding channel 46.

In use, blocks 39 are arranged contacting each other and inserted between plates 7 and 10 so that rear surfaces 43 contact coplanar surfaces 17 and 27 of plates 8 and 9, and ribs 44 engage grooves 45 and are thus gripped between plates 8 and 9. In the above position, intermediate portions 40 are arranged with their outer surfaces inclined facing oblique surfaces 20 and 30 of plates 21 and 31, so as to define, with plates 21 and 31, two tapered channels 47 and 48 converging towards the end of channel 46 and respectively communicating with ducts 11 and 23; and surfaces 42 are arranged coplanar with each other and with surfaces 22 and 32 of plates 21 and 31.

As shown particularly in FIG. 2, die 37 comprises two specularly identical blocks 49 arranged facing and one on top of the other, and each parallel to surface 3 and equal in length to the distance between surfaces 5 and 6. Each block 49 is the same thickness as each of plates 8 and 9, and is in the form of a rectangular parallelepipedon defined by a front surface 50 and rear surface 51 parallel to each other and to surface 3. The contacting surfaces of blocks 49 present respective grooves 52 defining a channel 53 perpendicular to surface 3 and substantially aligned with channel 46. Channel 53 terminates at the front in mouth or die outlet 38, and presents a rear end flaring towards surface 4 and communicating with both channel 46 and the outlet ends of channels 47 and 48. Outlet 38 is formed on the front end of a front appendix 54 substantially rectangular in section and extending frontwardly from coplanar surfaces 50.

In use, blocks 49 are arranged contacting each other and inserted between plates 7 and 10 so that rear surfaces 51 contact coplanar surfaces 42 of blocks 39 and surfaces 22 and 32 of plates 21 and 31 of plate 7 and 10. In the above position, coplanar front surfaces 50 project slightly forward in relation to surface 3 defined by the coplanar front surfaces of plates 7 and 10.

As shown particularly in FIGS. 2 and 3, head 1 also includes an outer casing 55 partially enclosing body 2 and comprising a cup-shaped bottom half shell 56 with its concave side facing upwards, and a cup-shaped top half shell 57 with its concave side facing downwards. Half shells 56 and 57 comprise respective flat bottom walls 58 and 59 of substantially the same shape and size, and respective lateral walls perpendicular to bottom walls 58 and 59 and comprising a front and rear wall 60 and 61 parallel to each other and to surfaces 3 and 4 and separated by a distance greater than that between said surfaces 3 and 4; and two lateral walls 62 and 63 parallel to surfaces 5 and 6 and separated by a distance greater than that between said surfaces 5 and 6.

Walls 62 and 63 are fitted through with connectors 64 perpendicular to walls 58 and 59 for drawing half shells 56 and 57 together and so compacting body 2 to a given pressure perpendicular to plates 7 and 10. Front walls 60 present respective recesses 65 defining a passage for appendix 54; rear walls 61 present respective recesses 66 defining an inlet channel for said cords; and lateral walls 63 present respective recesses 67 defining a channel engaged by outlet 12 of extruder 13.

Front walls 60 and lateral walls 63 present respective inner surfaces 68 and 69 parallel to and facing respective surfaces 3 and 6 and constituting the shoulder surfaces of two thrust devices 70 and 71 supported on bottom half shell 56 and designed to act on body 2 perpendicularly to respective surfaces 68 and 69. As shown in FIG. 1, device 70 is an axial thrust device comprising adjustable thrust elements consisting of screws 72 fitted through wall 61, and a push element 73 substantially in the form of a U to prevent interfering with the passage of said cords, and housed inside casing 55 to engage plates 7 to 10 along surface 4.

When torqued, screws 72 push the whole of body 2 towards shoulder surface 68, so as to compress surface 50 of die 37 into contact with surface 68 by means of plates 7 and 10 and respective plates 21 and 31, and wire guiding device 36 into contact with surface 51 of die 37 by means of plates 8 and 9 and respective surfaces 17 and 27.

By virtue of the above flat locating surfaces arranged contacting one another and parallel to shoulder surface 68, the mutual position of wire guiding device 36 and die 37, on which the geometry of the tread ply depends, is thus perfectly defined and substantially constant.

As shown in FIG. 1, device 71 is a transverse thrust device comprising adjustable thrust elements consisting of screws 74 fitted through wall 62, and a push element 75 consisting of a flat plate housed inside casing 55 and engaging plates 7 to 10 along surface 5 together with wire guiding device 36 and die 37. Push element 75 provides for pushing all the above components against shoulder surface 69 for ensuring fluid-tight connection of ducts 11 and 23 to outlet 12 of extruder 13, and correct transverse adjustment of wire guiding device 36 and die 37 in relation to each other and to plates 7 to 10.

Before setting ties 64 to the required compacting pressure on plates 7 to 10, thrust devices 70 and 71 are obviously set for positioning body 2 against shoulder surfaces 68 and 69. Thus, front walls 60, with their inner wall surfaces 68, act as locating wall means, relative to plate, 7 to 10, in a first direction. In like manner, lateral walls 63, with their inner wall surfaces 69, act as further locating wall means, relative to plates 7-10, in a second direction.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. An extrusion head for producing tread plies for road vehicle tires, connectable to an outlet of an extruder and including a number of shaped plates, a ply reinforcement guiding device and a die; said plates, when packed together, defining an intermediate guide duct for guiding said ply reinforcements, and two supply ducts for supplying extruded elastomeric material located on opposite sides of said guide duct, and locking together said ply reinforcement guiding device and said die; said extrusion head also including locating wall means perpendicular to said plates; said die presenting a first and second opposite surface parallel to said locating wall means; said ply reinforcement guiding device presenting a third surface parallel to said locating wall means; and pressure means being provided for acting on said plates in a first direction perpendicular to said locating wall means, so as to compress said die with said first surface contacting said locating wall means, and said ply reinforcement guiding device with said third surface contacting said second surface.

2. An extrusion head as claimed in claim 1, wherein said plates are four in number, of which two are outer plates and the other two are intermediate plates located between said outer plates; said outer plates projecting at one end in relation to said intermediate plates and gripping said ply reinforcement guiding device and said die.

3. An extrusion head as claimed in claim 2, wherein each outer plate presents, at said ply reinforcement guiding device, a plate arranged transversely in relation to said ducts and extending towards said ply reinforcement guiding device; each plate presenting a first lateral face defining, with a surface of said ply reinforcement guiding device, an end portion of a respective one of said supply ducts, and a second face parallel to said locating wall means and brought by said pressure means into contact with said second surface.

4. An extrusion head as claimed in claim 3, wherein on the side facing said locating wall means, said intermediate plates are defined by respective end surfaces parallel to said locating wall means; said ply reinforcement guiding device presenting a fourth surface opposite and parallel to said third surface; and said coplanar end surfaces of said intermediate plates being brought by said pressure means into contact with said fourth surface.

5. An extrusion head as claimed in claim 1, including further locating wall means parallel to said first direction, and further pressure means acting in a second direction perpendicular to said first direction and towards said further locating wall means; said plates, said die and said ply reinforcement guiding device presenting the same dimension in said second direction, and said further pressure means providing for bringing said plates, said die and said ply reinforcement guiding device into contact with said further locating wall means.

6. An extrusion head as claimed in claim 5, wherein said supply ducts are connected to the outlet of said extruder at said further locating wall means.

* * * * *

UNITED STATES PATENT AND TRADEMARK OFFICE
CERTIFICATE OF CORRECTION

PATENT NO. : 5,259,746
DATED : November 9, 1993
INVENTOR(S) : Diego Minaudo It is certified that error appears in the above-identified patent and that said Letters Patent is hereby corrected as shown below:

On title page, item [75] and item [19] change

"Minuado" to "Minaudo"

Signed and Sealed this

Twelfth Day of April, 1994

Attest:

BRUCE LEHMAN

*Attesting Officer*     *Commissioner of Patents and Trademarks*